L. P. SOETE.
CAR WHEEL.
APPLICATION FILED OCT. 12, 1921.
1,400,246.
Patented Dec. 13, 1921.
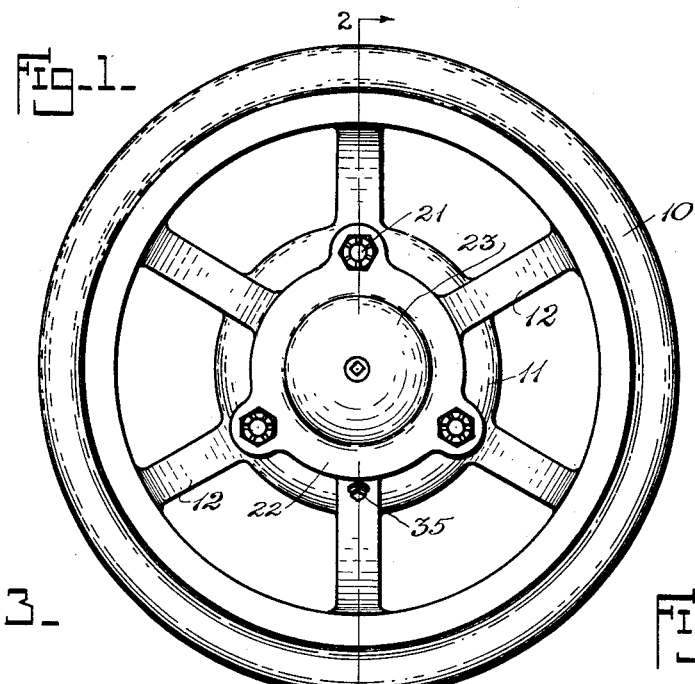
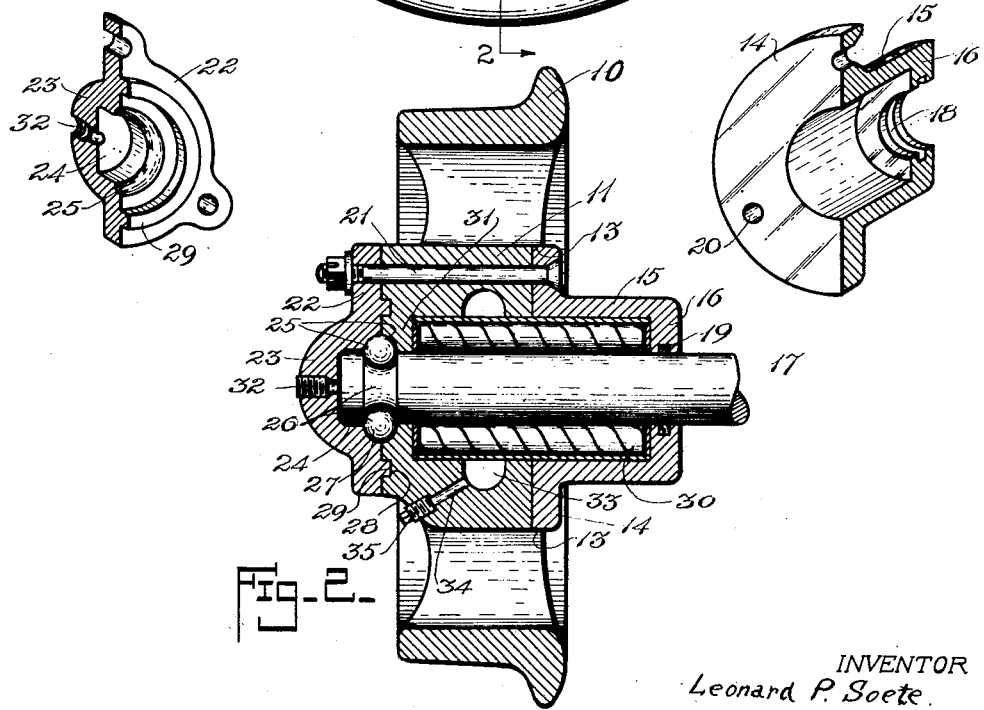
INVENTOR
Leonard P. Soete.
BY
Clarkson
ATTORNEY

UNITED STATES PATENT OFFICE.

LEONARD P. SOETE, OF LOUISVILLE, KENTUCKY.

CAR-WHEEL.

1,400,246.  Specification of Letters Patent.  Patented Dec. 13, 1921.

Application filed October 12, 1921. Serial No. 507,209.

*To all whom it may concern:*

Be it known that LEONARD P. SOETE, a citizen of the United States of America, residing at Louisville, in the county of Jefferson and State of Kentucky, has invented certain new and useful Improvements in Car-Wheels, of which the following is a specification.

This invention relates to an improvement in wheel construction and is designed more particularly for use in connection with track guided cars and other wheeled vehicles using heavy wheels revolving on a fixed axle or spindle.

One important object of the invention is to improve the general construction of the hub portion of such wheels.

A second important object of the invention is to provide an improved hub cap arrangement for wheels of this character.

A third important object of the invention is to provide an improved construction of built up hub wherein the inner end of the hub is formed separately from the body of the hub but wherein the spokes of the wheel coöperate with said inner end to hold the same central of the hub.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a side elevation of a wheel constructed in accordance with this invention.

Fig. 2 is a section on the line 2—2 of Fig. 1.

Fig. 3 is a perspective detail showing one-half of the improved hub cap used herewith.

Fig. 4 is a similar detail showing one-half of the detachable inner hub end used herewith.

In the embodiment of the invention herein illustrated there is disclosed a wheel provided with the usual flanged tire 10. This wheel has a centrally disposed hub 11 which is formed integral with the flange, with the flange and hub being connected by spokes 12. The inner edges of these spokes are cut away as at 13 to form shoulders and between these shoulders is fitted the flange 14 of an inner hub and including a hollow cylindrical body 15 provided with an internal annular flange 16. Through the opening in the flange 16 passes the usual shaft or axle 17, the flange being grooved as at 18 to receive dust guard packing 19. In the flange 14 are formed counter-sunk bolt holes 20 and through these bolt holes and suitable openings in the main hub 11 pass the securing bolts 21. The outer ends of these bolts pass also through suitable openings in the flange 22 of a hub cap 23 recessed as at 24 to provide spacing for the outer end of the shaft 17. In the main hub 11 and hub cap 23 are provided complemental grooves 25 so arranged that when the hub cap is in position these grooves form a semi-circle in cross section, a similar semi-circular groove 26 being formed in the shaft 17 in order that retaining balls 27 may be held in these grooves and prevent the wheel moving longitudinally of the shaft. In the main hub 11 is also formed an annular groove 28 and on the face of the hub cap 23 is an annular tongue or flange 29 which, when the hub cap is in place, fits in the groove 28. It is preferred that the hub body 11 and hub end 15 be of sufficient internal diameter to accommodate a roller bearing 30 which is held in position by the inwardly extending portion 31 of the main hub 11 and by the flange 16 of the inner hub end. In this way the roller bearing is thoroughly protected from dust or the like since the inner end is protected by the dust packing 19 while the outer end is protected both by the inwardly extending portion 31 of the hub and by the hub cap, the tongue and grove arrangement of said cap preventing any dust or dirt working in. For lubrication purposes the hub cap is provided with the usual tapped opening 32 for the reception of an oil cup or a grease cup and the hub body is provided with an annular channel 33 around the roller bearing. From this channel leads a passage 34 normally closed by a plug 35, the passage forming a filling opening so that lubricant can be injected into the channel 33 by removing the plug 35 and injecting the same through the passage 34.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In a wheel of the class described, a hub body having an inwardly extending flange at its outer end, said hub body being further provided with an internal annular groove intermediate its ends and having port communications with the exterior of the hub body, an inner hub end secured to said hub body and having an inwardly extending flange at its inner end, a shaft passing through said hub body and inner hub end, and a roller bearing surrounding said shaft between the annular flanges of the hub body and hub end.

2. In a wheel of the class described, a hub body having an inwardly extending flange at its outer end, said hub body being further provided with an internal annular groove intermediate its ends and having port communications with the exterior of the hub body, an inner hub end secured to said hub body and having an inwardly extending flange at its inner end, a shaft passing through said hub body and inner hub end, a roller bearing surrounding said shaft between the annular flanges of the hub body and hub end, and spokes radiating from the hub body and projecting inwardly thereof to form shoulders for holding the inner end concentric with the hub body.

3. In a wheel of the class described, a hub, a shaft passing through said hub, said hub having an annular groove on its outer face, a hub cap covering the outer end of said shaft and provided with a tongue fitting in said groove, and means to hold the hub cap on the hub body.

In testimony whereof I affix my signature.

LEONARD P. SOETE.